BEST AVAILABLE COP'
(No Model.)
T. A. EDISON.
ELECTRICAL METER.
No. 307,030. Patented Oct. 21, 1884.
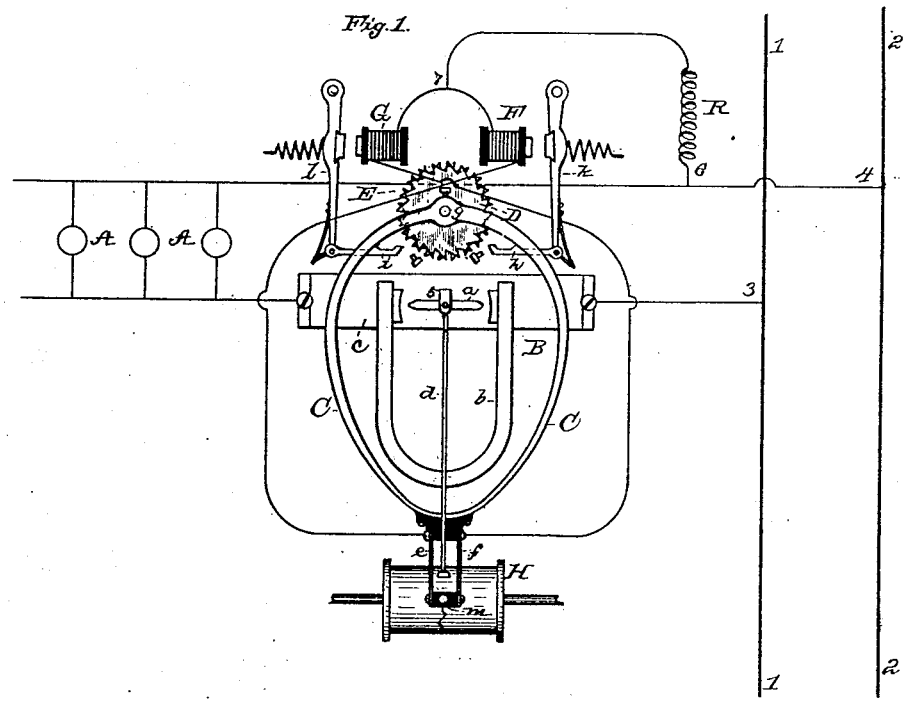
ATTEST:  INVENTOR:

UNITED STATES PATENT OFFICE.

THOMAS A. EDISON, OF MENLO PARK, NEW JERSEY.

ELECTRICAL METER.

SPECIFICATION forming part of Letters Patent No. 307,030, dated October 21, 1884.

Application filed October 10, 1883. (No model.)

*To all whom it may concern:*

Be it known that I, THOMAS A. EDISON, of Menlo Park, in the county of Middlesex and State of New Jersey, have invented a new and useful Improvement in Electrical Meters, (Case No. 588$^a$,) of which the following is a specification.

The object I have in view is to produce simple and efficient apparatus for measuring or determining the electrical energy consumed in a circuit wherein translating devices are arranged in multiple arc, and especially to produce a meter suitable for use in my multiple-arc system of electrical distribution. This I accomplish by arranging in the main line of the circuit a galvanometer the movement of whose needle controls circuits to electrically-operated apparatus, which apparatus controls an indicating or registering device. Preferably the apparatus controlled by the galvanometer is used to adjust the lateral position of a stylus bearing upon a traveling strip of paper, and marking thereon an irregular line, which will indicate at all times the flow of the current. From an inspection of the marked strip it can easily be determined what energy has been consumed in the circuit. The apparatus controlled by the galvanometer may be of any suitable character; but I prefer to use an apparatus similar to that described in my application No. 99,559, the motion being produced by the effect of the current upon a galvanometer needle or bar, which carries an arm closing circuit at moving contacts to operating magnets moving another arm carrying the stylus and following the movements of the galvanometer-arm. The needle of the galvanometer is arranged in a magnetic field, and is moved out of that field more or less by variations in the current. These variations and the movement of the galvanometer-needle are directly proportional to the energy consumed in the circuit, and hence the line marked upon the moving strip will form an accurate record of the energy consumed. The strip may be moved by any suitable device, a clockwork or an electric motor being employed for that purpose.

In the accompanying drawings, forming a part hereof, Figure 1 is a top view, partly diagrammatic, of apparatus embodying the invention; and Fig. 2, a vertical section through the galvanometer.

With reference to Figs. 1 and 2, 1 2 are the street conductors or mains, and 3 4 are the conductors of a house-circuit having lamps, motors, or other translating devices arranged in multiple-arc or derived circuits therefrom. B is a galvanometer located in the main line of the circuit 3 4; or, as will be well understood, it may be arranged in a shunt around a definite resistance in said circuit. The galvanometer shown has its needle $a$ located in the field of a magnet, $b$. The electrical conductor of the galvanometer is a straight strip, $c$, of low resistance, located directly in the circuit 3 4; but one or more coils could be used if the galvanometer were arranged in a shunt around resistance. The needle $a$ is pivoted directly upon the conducting-strip $c$, and carries an arm, $d$. This arm plays freely at its outer end between contacts $e f$, carried by an arm, C, which follows closely the movements of the galvanometer-arm. This arm C is secured to a shaft, $g$, which is preferably in line with the pivot of the needle $a$, but, for convenience of illustration, is shown as located back of the pivot of $a$.

Upon the shaft $g$ are mounted two ratchet-wheels, D E, with teeth turned in opposite directions, and with these ratchet-wheels engage pawls $h\ i$, carried by the armature-levers $k\ l$ of electro-magnets F G. The electro-magnets F G are in divisions of a multiple-arc circuit, 5 6, from 3 4. This circuit commences at 5 on the strip $c$, forming part of conductor 3, and terminates at 6 on the conductor 4. The circuit divides at the point 7, and extends to the contacts $e f$, the electro-magnets being located in the divisions of the circuit. The resistance R is preferably included in the circuit. The circuit 5 6 is completed by the touching of either contact $e$ or $f$ by the arms $d$, and one division or the other of this circuit is completed, according to whether the arm touches one or the other contact. The closing of either branch of circuit 5 6 causes the electro-magnet to move the arm C so that the contact will move away from the needle-arm and break the circuit. The needle-arm will follow up the contact until the entire deflection due to the variation in the current is accomplished. The arm C at any suitable point carries a stylus, m. This stylus bears on a strip of paper on a roller, H, which is revolved in any suitable manner by clock-work or an electro-magnet. The arm C, it will be seen, is given a positive movement by the electro-magnets, and follows closely the movement of the galvanometer-arm, such galvanometer not being rendered less sensitive by undue friction. The electrical energy consumed by the translating devices A will be accurately recorded on the traveling strip of paper.

I do not claim herein, broadly, the means for producing motion electrically described in connection with Fig. 1, since the same is claimed in my application No. 99,559.

I am aware of German Patent No. 22,991, dated May 11, 1882; but in this the controlling-galvanometer is not in the main line, as is the case in my invention.

What I claim is—

1. The combination, with an electrical circuit and translating devices arranged in multiple-arc therein, of a galvanometer in the main line, a circuit controlled by said galvanometer, electrically-operated apparatus in such circuit, and indicating or registering devices operated or controlled by such apparatus, substantially as set forth.

2. In an electrical meter, the combination, with a galvanometer arranged to be affected by the current of the circuit in which the consumption of electrical energy is desired to be measured, of moving contacts at which circuits are made and broken by the galvanometer-arm, and a registering or indicating apparatus controlled thereby, substantially as set forth.

3. In an electrical meter, the combination, with a galvanometer-arm included in an electrical circuit, of another arm following the movement of such galvanometer-arm, electrically-operated devices moving such second arm, the circuit of which is controlled by the galvanometer-arm, and a registering or indicating apparatus operated by said second arm, substantially as set forth.

4. In an electrical meter, the combination, with a galvanometer-arm, of another pivoted arm carrying on its free end insulated contacts, between which the galvanometer-arm plays, two electro-magnets located in circuit with such contacts and operating pawl-levers, oppositely-arranged ratchet-wheels worked by such pawl-levers and moving said pivoted arm, and a registering or indicating apparatus, substantially as set forth.

5. In an electrical meter, the combination, with a galvanometer, of a pivoted arm carrying a stylus, and electrically-operated means controlled by the galvanometer and moving said pivoted arm, substantially as set forth.

6. In an electrical meter, a galvanometer provided with a constant field, in which its needle is located, and a single low-resistance current-conductor located directly in the circuit in which the consumption of energy is to be measured, in combination with an electrically-operated registering or indicating apparatus controlled by the galvanometer, substantially as set forth.

This specification signed and witnessed this 8th day of August, 1883.

THOS. A. EDISON.

Witnesses:
 H. W. SEELY,
 EDWARD H. PYATT.